United States Patent Office 3,189,807
Patented June 15, 1965

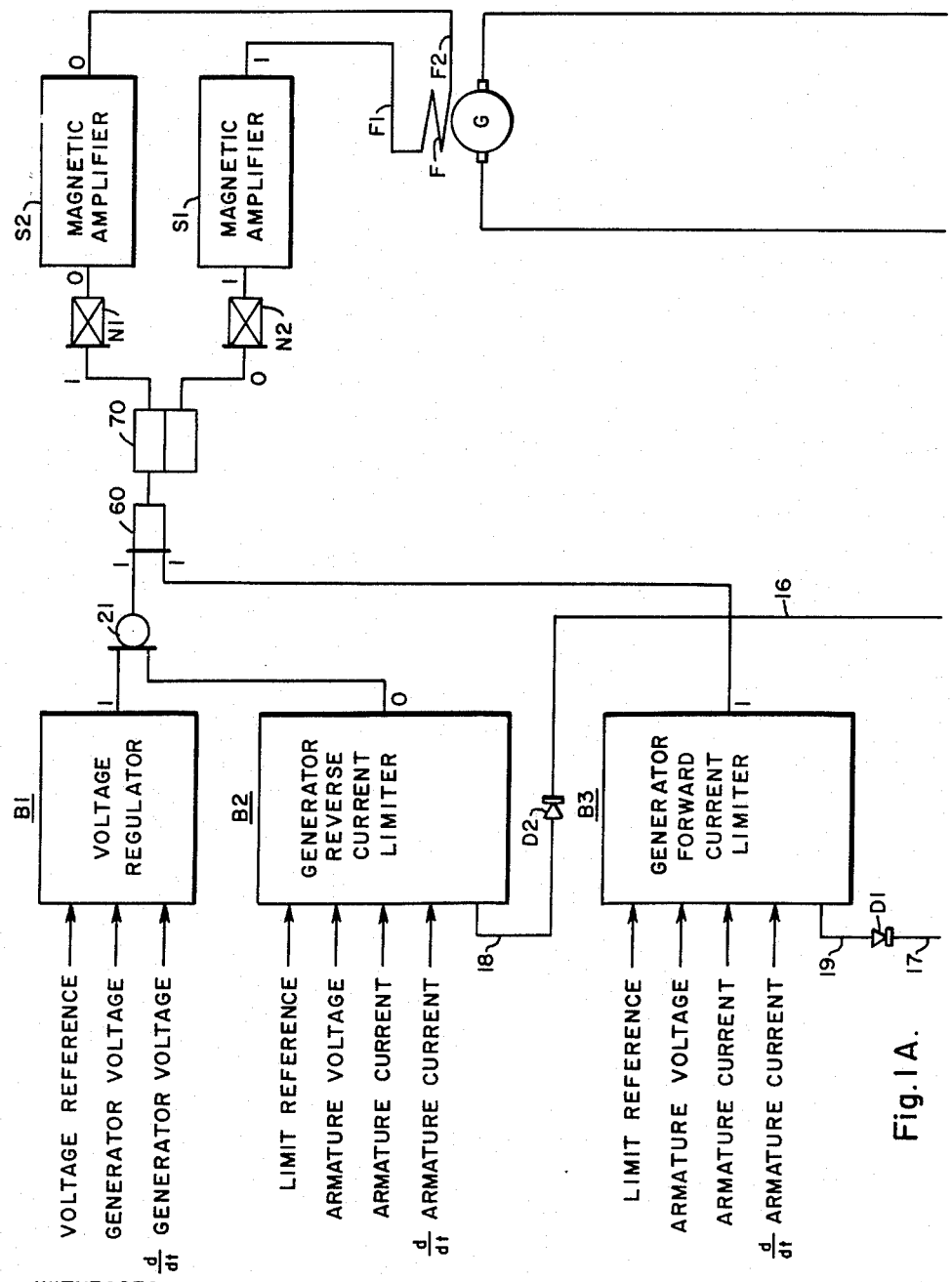
Fig. IA.

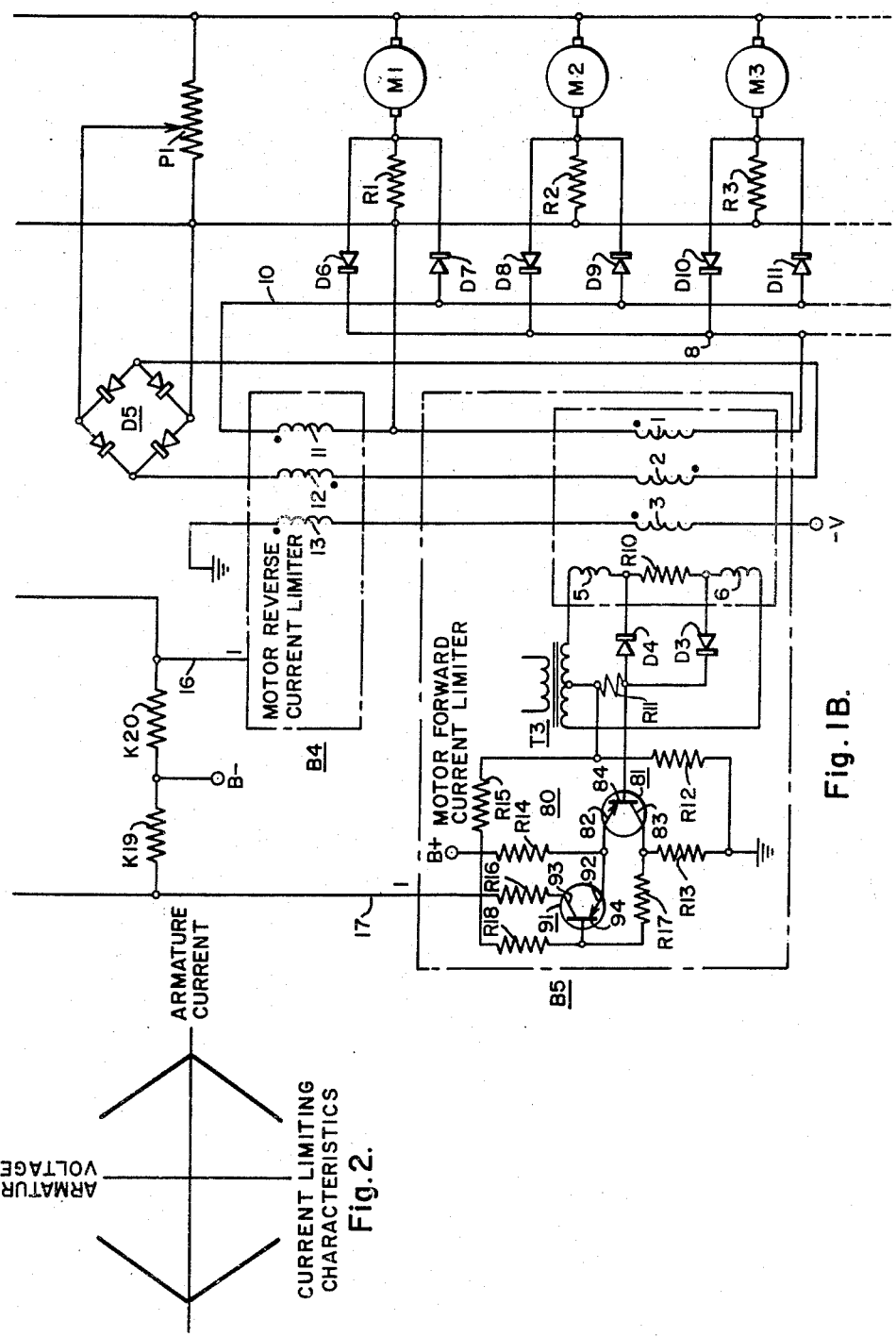

3,189,807
PLURAL MOTOR CURRENT LIMIT REGULATOR
John Rosa, Pittsburgh, and Eugene P. Ross, Kenmore, Pa., assignors to Westinghouse Electric Corporation, East Pittsburgh, Pa., a corporation of Pennsylvania
Filed July 20, 1961, Ser. No. 125,508
8 Claims. (Cl. 318—98)

In general, this invention relates to a motor current limit scheme for use with a multi-motor regulator. More particularly, it relates to a motor current regulator used in conjunction with a general purpose static regulator for controlling a Ward-Leonard type drive where a single direct current generator feeds more than one direct current motor.

This invention is related to the type of regulator shown in the copending application to John Rosa on an "Optimum Response Regulator," S.N. 125,507 filed concurrently herewith.

The motor current load scheme of the present invention is operative to supply signal to a regulator such as that shown in the above-mentioned application when the current in any one of many motor armature circuits fed from a single D.C. source rises above a predetermined limit. This signal controls the regulator such that the direct current supply tends to limit the current in the motors.

It is the general object of this invention to provide an improved current limiting scheme for a multi-motor drive.

Another object of the invention is to provide a multi-motor current limiting scheme in which there is individual control of the current in the supply generator and each of the connected motors such that the current limiting action for the motors is independent of the current limiting action for the generator.

Another object is to provide an improved multi-motor current limiting regulator in which the motor current limiting action may be adjusted independently of the generator current limiting action.

Another object of this invention is to provide a flexible motor current limiting scheme which may be utilized with the static general purpose optimum response type regulator.

Another object is to provide a motor current limiting scheme for a plural motor drive in which the addition of new motors to the drive does not affect the basic regulator scheme.

Another object of this invention is to provide a better and more efficient motor current limiting scheme which will achieve four quadrant current limiting operations and will vary the current limits in accordance with the supply voltage.

Another object of the invention is to provide a motor current limit scheme in which the current limiter is responsive to only that motor current signal which is higher than the rest.

Another object is to provide a new and improved regulator for a Ward-Leonard type multi-motor drive in which are utilized only solid state switching elements.

The aforesaid objects of the invention and other objects which will become apparent as the description proceeds are achieved by providing a regulator for Ward-Leonard system having more than one motor which may be used to accurately maintain the controlled variable such as speed or voltage of the motors by reversibly energizing the field of the supply generator. The regulator consists of a static bistable device operable to give one of two outputs dependent upon the difference between a reference signal and the sum of certain feedback signals. The two states of the output signal of the bistable device operate through amplifiers to reversibly energize the field of the generator so that maximum positive or negative forcing is always being applied to the generator field. Current limiting bistables are also part of the regulator and they operate to override the controlled variable bistable when the forward or reverse current in the motor or generator circuits exceed certain limits. The generator current limit bistables have their own current limit reference and obtain a feedback signal which is proportional to the current supplied by the generator. The motor current limit bistables also have a current limit reference and obtain their feedback signal from the motor drawing the most current in the Ward-Leonard system. This feedback signal is obtained through the use of isolating diodes for both forward and reverse current signals. The current limit references of the generator and motor current limit bistables are modified by a signal proportional to the generator supply voltage.

The apparatus of this invention will become more apparent by reference to the attached drawings in which:

FIGURES 1A and 1B are a schematic showing of a voltage regulator using the principles of the present invention; and FIG. 2 is a graphic display of the four quadrant current limiting action of the motor current regulators.

In the drawings, the manner in which the windings have been wound upon their associated saturable magnetic cores has been denoted by the polarity dot convention, that is, current flowing into the polarity dot end of the winding will drive the associated core towards positive saturation. Current flowing out of the polarity dot end of a winding will drive the associated core away from positive saturation. In FIG. 1, a plural motor Ward-Leonard system is shown which will be controlled by the regulator of the present invention. The Ward-Leonard system consists of a generator G whose armature is in parallel with a plurality of motors M1, M2, M3, etc., whose armatures are in series with an associated series resistor R1, R2, R3, etc. Also placed across the armature terminals of the generator G is the potentiometer P1. The generator G is controlled by its field winding F. Voltage is reversibly supplied to the generator field F by the magnetic amplifiers S1 and S2. The amplifiers S1 and S2 are connected in push-pull and designed to supply one value, the maximum effective value of voltage to the field F. This voltage is applied so that either terminal F1 is positive and terminal F2 is negative, or vice versa. Changing the direction of the field of the generator F tends to reverse the output voltage of the generator G. The regulator of the present invention is operative to control the operation of the magnetic amplifiers S1 and S2 so as to reversibly supply voltage to the generator field winding G. The operation of the regulator of the present invention shown in FIG. 1A with the exception of lines 18 and 19 are more completely described in the above-mentioned application by John Rosa. However, for the purposes of clarity they will be described below.

The regulator of the present invention is operative to control the voltage supplied by generator G. However, it will be understood that this regulator may be used to control any variable of a Ward-Leonard system. The voltage regulator bistable magnetic amplifier B1 is substantially similar to the motor forward current limiter bistable magnetic amplifier B5 which will be described below. However, for the present, let it be understood that if the input reference signal is greater than the sum of the feedback voltages, the output of the voltage regulator bistable B1 will be a "one" and if the reference signal is less than the sum of the feedback signals, the output of the bistable B1 will be a "zero." Three signals are applied to the bistable magnetic amplifier B1.

They are a voltage reference signal proportional to a desired voltage for the generator G and two feedback signals. The first feedback signal is proportional to the generator voltage and the second signal is proportional to the rate of change of generator voltage so as to anticipate the approaching of the first feedback signal to the reference signal.

The generator reverse current limiter bistable B2 and the generator forward limiter bistable B3 are also similar in structure to the motor forward current limiter B5, which will be described below. The generator reverse current limiter bistable B2 is operative such that if the sum of the feedback signals is greater than the current limit reference the output of the bistable B2 will be "zero" and vice versa. The generator forward current limiter bistable B3 is operative such that if the sum of the feedback signals is less than the current limit reference, the output of the bistable B3 will be a "one" and vice versa. Each of the generator current limiting bistables B2 and B3 has five input signals. The first is a current limit reference, that is, a forward current limit reference for the generator forward current limiter B3 and a reverse current reference for the generator reverse current limiter B2. Each has an armature voltage feedback signal which lowers the effective generator current reference with increased generator voltage. This four quadrant current limiting is explained in the above-mentioned application by John Rosa and is similar to the motor current limit reference described with reference to FIG. 2. Each of bistables B2 and B3 is also supplied with two feedback signals which are respectively proportional to the generator armature current and to the rate of change of generator armature current. The rate of change of armature current signal is used to anticipate the approaching of the armature current feedback signal to the current limit reference. The armature current signal may be obtained from a resistor in series with the armature of the generator G and the rate of change of armature current signal may be obtained by differentiating the armature current signal. The fifth input, or lines 18 and 19, applied to bistables B2 and B3 respectively, are obtained from the motor reverse current limiter B4 and the motor forward current limiter B5. The outputs of the bistables B1 and B2 are fed to a non-exclusive OR circuit 21, which may simply be a junction point, and then to one input of an AND circuit 60. The other input of the AND circuit 60 is obtained from the output of the bistable device B3. The AND device 60 feeds a flip-flop circuit 70 whose outputs control two NOT circuits N1 and N2. NOT circuit N1 controls magnetic amplifier S2 and NOT circuit N2 controls magnetic amplifier S1.

There are three input signals applied to the motor reverse current limiter B4 and the motor forward current limiter B5. The first is a motor current limit reference signal applied from a source —V of negative voltage through winding 3 on forward current limiter B5 and winding 13 on reverse current limiter B4 to ground. A second signal is obtained by using a diode bridge D5 across a portion of the potentiometer P1 to supply feedback windings 12 and 2 of the bistables B4 and B5, respectively. The signal is proportional to the generator or motor voltage.

A motor forward current signal, to be applied to winding 1 of bistable B5, is obtained by connecting forwardly poled diodes D6, D8, D10, etc. to one terminal of resistors R1, R2, R3, etc. and then to line 8. The winding 1 is connected between line 8 and the other terminals of the resistors R1, R2, R3, etc. The motor reverse current limiting bistable B4 has a feedback current winding 11 which is connected through line 10 to one terminal of the reversely poled diodes D7, D9, D11, etc. through their respective resistors R1, R2, R3, etc. back to the other terminal of the winding 11. Voltage signals proportional to the current in the armature circuits of the motors M1, M2 and M3 are obtained across their respective resistors R1, R2 and R3. If this current is in the forward direction, it will attempt to transmit a signal through the forward poled diodes D6, D8, D10, etc. and if in the reverse direction through the reversely poled diodes D7, D9, D11, etc. However, the motor drawing the highest current in a given direction will transmit through its associated diode a signal which will back-bias the diodes of the other motors such that only the voltage signal from the motor with the highest armature current will be transmitted to its associated feedback winding 11 or 1. The windings 13 and 12 on reverse current limiting bistable B4 and windings 3 and 2 on forward current limiting bistable B5 form the four quadrant current limiting characteristic shown in FIG. 2. The current limit reference in either the forward or reverse direction is decreased with increasing generator voltage. The windings 1 and 11 of bistables B5 and B4, respectively, receive a signal proportional to the current in a given direction which is higher than the currents in any other motor armature circuit.

The motor forward current limiting bistable magnetic amplifier B5 comprises two magnetic amplifiers associated with load windings 5 and 6 respectively. Each of these load windings 5 and 6 has inductively disposed thereto the control windings 1, 2 and 3. A transformer T3 supplied from an alternating current source is connected to drive the gating circuit of the magnetic amplifier. The gating circuit for the magnetic amplifier associated with winding 5 comprises one half of the secondary winding of transformer T3, gating winding 5, diode D4 and resistance R11. The gating circuit for the magnetic amplifier associated with the load winding 6 comprises the other half of the secondary of transformer T3, load winding 6, diode D3 and load resistor R11. The resistor R10 is placed between load windings 5 and 6 for biasing purposes. The magnitude of the biasing signal is sufficient to set the flux level in the cores of the two magnetic amplifiers so that when the sum of the signals applied to the control windings 1, 2 and 3 is zero, the magnetic amplifiers will saturate, and will fire at 90°. That is, on a reset half cycle the bias current will reset the flux level in the respective cores to a point where on the next half cycle the supply or gating voltage from the transformer T3 will require substantially one half of a half cycle or 90° to saturate the respective core. Thus, there would be no output voltage signal across resistance R11.

A Schmitt trigger circuit 80 is actuated by the voltage across R11. This trigger comprises a pair of three electrode transistor devices 81 and 91. The transistor 81 comprises a semiconductive body having an emitter electrode 82, a collector electrode 83 and a base electrode 84. The transistor 91 comprises a semiconductor body having an emitter electrode 92, a collector electrode 93 and a base electrode 94. The emitter electrodes 82 and 92 are connected through resistor R14 to a B+ power supply. The collector electrode 83 is connected through a feedback resistor R17 to the base electrode 94 of the transistor 91. The base electrode 84 is connected to one terminal of the resistance R11. The base electrode 94 is connected through a resistance R18 to the B+ power supply. The center tap of the transistor T3 is connected through a resistance R15 to the B+ power supply and through a resistance R12 to ground. The collector of transistor 84 is connected through a resistance R13 to ground and the collector 93 is connected through resistance R16 to the line 17.

The operation of the magnetic amplifier B5 is as follows. As hereinbefore described, the two magnetic amplifiers associated with the load windings 5 and 6 with no control signal present, have been biased to fire at 90°. That is, the outputs of the load windings 5 and 6 will fire at 90° and the voltages thereafter produced will oppose each other across resistance R11 and thus no other voltage will be transmitted to the transistor 81. If the sum of the feedback voltages is greater than the reference voltage, the magnetic amplifier whose load winding is 5 will fire just before 90° and the magnetic amplifier associated with load winding 6 will fire just after 90°. The magnetic amplifier whose load winding is 5 will be driven slightly more toward positive saturation while the magnetic amplifier whose load winding is 6 will be driven slightly away from positive saturation because of the effect of the sum of the voltages on the input to the magnetic amplifier. There will then appear across resistor R11 a voltage signal which will apply a negative voltage to the base of transistor 81.

It is assumed that in the Schmitt trigger circuit 80 the transistor 91 has been conducting and the transistor 81 has been cut off. The voltage dividing network comprising the resistor R15 and the resistor R12 has applied a bias voltage to the base electrode 84 of a proper polarity to keep the transistor 81 biased to non-conduction. However, when the output across the resistor R11 goes negative as hereinbefore described, it is of the proper polarity in magnitude to drive this transistor 81 to conduction, that is, towards saturation. This allows conduction emitter 82, collector 83, circuit of the transistor 81 which will then feed back a signal through the resistor R17 to the base electrode 94 of the transistor 91 which is of the polarity to start driving the transistor 91 towards "cut off." As conduction through the emitter 92, collector 93 circuit of the transistor 91 decreases, the potential on the emitter electrode 82 of the transistor 81 rises. This potential on the emitter 82 of the transistor 81 effectively raises the bias potential between the emitter 82 and the base electrode 84 of the transistor 81 allowing it to be driven further toward saturation. The two effects just described cooperate to produce a snap action switching operation of the Schmitt trigger 80. When at a later time the reference signal on windings 3 and 2 exceeds the sum of the signals on the feedback winding 1, the polarity of the output across resistor R11 is reversed which stops the conduction of the transistor 81 allowing the transistor 91 to conduct in its emitter 92, collector 93 circuit.

Thus, when the reference signal is greater than the sum of the feedback signals, transistor 91 conducts in its collector 93, emitter 92 circuit and effectively has a "one" output. When the reference signal is less than the sum of the feedback signals, the transistor 91 is cut off and there is no conduction in its emitter collector circuit and there is effectively a "zero" output signal. For a more complete description of a bistable transistorized magnetic amplifier, such as is shown in FIG. 1, reference should be had to the application of Roland W. Roberts et al., Serial No. 782,017, filed December 22, 1958, and entitled "Bistable Amplifier Circuit."

A supply voltage B— is adapted to supply a signal through resistance R19, to line 17, reversely poled diode D1 to the line 19 which feeds the generator forward current limiter B3. The voltage supply B— is also adapted to supply a signal through resistor R20, line 16, reversely poled diode D2, line 18 to the generator reverse current limiter B2. This signal, if applied to either of the bistables B2 or B3 would in itself be enough to overcome the current limit references of the respective forward or reverse current limiting bistable magnetic amplifier. This signal from the B— voltage supply would be applied to the inputs 18 and 19 if there is no "one" signal on lines 16 and 17. If there is a "one" signal on lines 17, a circuit will be formed from the B+ power supply through resistor R14, the collector 93, emitter 92 circuit of transistor 91, resistor R16, to line 17. When this occurs, the voltage supplied from the B+ voltage supply will back bias the diode D1 so that no signal will be transmitted through the diode D1 from the B— voltage supply. Similarly, if there is a "one" signal on line 16, the diode D2 will be back biased and no signal will be applied to the input 18 from the B— voltage supply. Conversely, if there is a "zero" signal, on line 17, or line 16, the transistor 91 will be cut off, and no signal will be transmitted from the B+ supply, causing the diodes D1 and D2, respectively, to conduct. This current flowing into the respective generator current limiting bistable amplifier B3 or B2 will result in the same limiting effect as if the generator armature current had reached the preset limit value.

In order to get a better picture of the operation of the present invention, a chart of the operation of the voltage regulator for all possible conditions is shown below.

|  | B1 | B2 | B3 | B4 | B5 | F1 | F2 |  |
|---|---|---|---|---|---|---|---|---|
| Fwd. run: |  |  |  |  |  |  |  |  |
| Voltage<ref | 1 | 0 | 1 | 1 | 1 | + | − | Increase fwd. voltage. |
| Voltage>ref | 0 | 0 | 1 | 1 | 1 | − | + | Decrease fwd. voltage. |
| Fwd. run + acceleration | 1 | 0 | 0 | 1 | 1 | − | + | Limit positive gen. current. |
| Fwd. run + deceleration | 0 | 1 | 1 | 1 | 1 | + | − | Limit negative gen. current. |
| Rev. run: |  |  |  |  |  |  |  |  |
| Voltage<ref | 0 | 0 | 1 | 1 | 1 | − | + | Increase rev. voltage. |
| Voltage>ref | 1 | 0 | 1 | 1 | 1 | − | + | Decrease rev. voltage. |
| Rev. run + acceleration | 0 | 1 | 1 | 1 | 1 | + | − | Limit negative gen. current. |
| Rev. run + deceleration | 1 | 0 | 0 | 1 | 1 | − | + | Limit positive gen. current. |
| Fwd. run + motor accel | 1 | 0 | 0 | 1 | 0 | − | + | Limit positive motor current. |
| Fwd. run + motor decel | 0 | 1 | 1 | 0 | 1 | + | − | Limit negative motor current. |
| Rev. run + motor accel | 0 | 1 | 1 | 0 | 1 | + | − | Do. |
| Rev. run + motor decel | 1 | 0 | 0 | 1 | 0 | − | − | Limit positive motor current. |

The outputs of the various bistables B1 through B5 shown in FIG. 1 are for the operation when the voltage reference signal is greater than the generator voltage and no current limiting is necessary. Since the output of the bistable B1 is "one," the output of the non-exclusive OR circuit 21 is also a "one" and since the output of the bistable B3 is "one," the AND circuit 60 will produce a "one" output. If there is a "one" input to the flip-flop 70, its output which feeds NOT circuit N1 is a "one" and the output which feeds NOT circuit N2 is a "zero." The NOT circuits N1 and N2 invert their input signals and their output is amplified by their associated magnetic amplifiers, S2 and S1. These magnetic amplifiers supply the power to the field F of the generator G. The "one" on the output of the magnetic amplifier S1 is used to denote the fact that the terminal F1 of the field F is positive and the "zero" at the output terminal of the magnetic amplifier S2 is used to denote that this terminal F2, of the field F, is at a negative potential. The operation of the voltage regulator with generator and motor current limiting can thus be seen by a study of the chart of operation shown above.

It will be noted that none of the bistable magnetic amplifiers B1, B2, B3, B4 and B5 has a linear range so that their output is either a "one" or a "zero." This means that the field of the generator F is constantly being regulated by being reversed at a random rate which is limited by the speed of response of the magnetic amplifiers. It can be understood by anyone skilled in the art that although the applied voltage to the field of the generator is being reversed, the field does not have time to collapse and therefore in actual operation all that is happening is that the flux in the field is being forced to change in a given direction in as short a period of time as the electrical limitations of the generator structure will allow. This is optimum response control. The use of static switching elements has enabled the regulator to be continuously operative.

While some best known embodiments of the invention have been illustrated and described in detail, it is to be particularly understood that the invention is not limited thereto or thereby.

We claim as our invention:

1. In a system for controlling a generator operatively connected to supply power through its armature to a plurality of motors having individual armature circuits, the combination of regulating means adapted to control said generator to vary the power supplied to said motors, generator current limiting means for controlling said regulating means in response to the current in said generator armature exceeding a preset value, current sensing means adapted to sense the current in the armature of each of said motors, and current limiting means adapted to control said regulating means in response to said sensing means when the current in any motor armature exceeds preset values in either direction.

2. In a system for reversibly supplying power to the field of a generator whose armature is operatively connected to supply power to a plurality of motors having individual armature circuits, the combination of regulating means adapted to reversibly supply power to said generator field to control said generator, generator current limiting means adapted to control said regulating means when the current in said generator armature exceeds a preset value, current sensing means adapted to sense the magnitude and direction of flow of the current in the armature of each of said motors, and motor current limiting means adapted to control said regulating means in response to said sensing means when the current in any motor armature exceeds preset values in either direction.

3. In a system for reversibly supplying power to the field of a generator whose armature is operatively connected to supply power to a plurality of motors having individual armature circuits, the combination of regulating means adapted to reversibly supply power to said generator field to control said generator, generator current limiting means adapted to control said regulating means when the current in said generator armature exceeds a preset value, current sensing means operative to sense the magnitude and direction of flow of the current in the armature of each of said motors, motor current limiting means adapted to control said regulating means in response to said sensing means when the current in any motor armature exceeds preset values in either direction, and unidirectional conducting devices connected between said current sensing means and said motor current limiting means to allow only the highest sensed motor armature current signal in each direction to the said motor current limiting means.

4. In a system for reversibly supplying power to the field of a generator whose armature is operatively connected to supply power to a plurality of motors having individual armature circuits, the combination of regulating means adapted to reversibly supply power to said generator field to control said generator, generator current limiting means adapted to control said regulating means when the current in said generator armature exceeds a preset value, current sensing means adapted to sense the magnitude and direction of flow of the current in the armature of each of said motors, motor current limiting means adapted to control said regulating means in response to said current sensing means when the current in any motor armature exceeds a preset value in either direction, and voltage sensing means adapted to vary said motor current limiting means preset value in accordance with a voltage signal proportional to the generator supply voltage.

5. In a system for controlling a generator operatively connected to supply power in parallel to the armature circuits of a plurality of motors having individual armature circuits which are connected in parallel, the combination of regulating means adapted to control said generator to vary the power supplied to said motors, current sensing means adapted to sense the current in the armature of each of said motors, current limiting means operative to control said regulating means in response to said current sensing when the current in any motor armature exceeds a preset value, and means responsive to the generator supply voltage for varying said current limiting means preset value in accordance with the generator supply voltage whereby said preset value decreases as said voltage increases.

6. In a system for reversibly supplying power to the field of a generator whose armature is operatively connected to supply power in parallel to the armature circuits of a plurality of motors having individual armature circuits which are connected in parallel, regulating means for reversibly supplying power to said generator field to control said generator, generator current limiting means for controlling said regulating means in response to the current in said generator armature exceeding a preset value, current sensing means for sensing the current in the armature of each of said motors, motor current limiting means responsive to said current sensing means for controlling said regulating means when the current in any motor armature exceeds a preset value, and means responsive to the generator supply voltage for affecting said motor current limiting means to reduce said motor current limiting means preset value as said voltage increases.

7. In a system for reversibly supplying power to the field of a generator whose armature is operatively connected to supply power in parallel to the armature circuits of a plurality of motors having individual armature circuits that are connected in parallel, the combination of regulating means adapted to reversibly supply power to said generator field to control said generator, current sensing means adapted to sense the current in the armature of each of said motors, motor current limiting means responsive to said current sensing means for controlling said regulating means when the current in any motor armature exceeds a preset value, and means responsive to the generator supply voltage for affecting said motor current limiting means in such manner that said motor current limiting means preset value decreases as the generator supply voltage increases.

8. In a system for reversibly supplying power to the field of a generator whose armature is operatively connected to supply power in parallel to the respective armature circuits of a plurality of motors having individual armature circuits that are connected in parallel, regulating means for reversibly supplying power to said generator field to control said generator, bistable generator current limiting means for controlling said regulating means in response to the current in said generator armature exceeding a preset value, current sensing means for sensing the current in the armature of each of said motors, bistable motor current limiting means responsive to said current sensing means for controlling said regulating means when the current in any motor armature exceeds a preset value, and means responsive to the generator supply voltage for affecting said motor current limiting means to reduce said motor current limiting means preset value as said voltage increases.

References Cited by the Examiner

UNITED STATES PATENTS

| 2,342,767 | 2/44 | Staltz | 318—158 X |
|---|---|---|---|
| 2,659,040 | 11/53 | Halter | 318—144 X |
| 2,677,082 | 4/54 | Allbert et al. | 318—63 |
| 3,095,530 | 6/63 | Woodword | 318—341 X |

FOREIGN PATENTS 207,962  3/60  Austria.

ORIS L. RADER, *Primary Examiner.*